June 4, 1963 D. VERNIK 3,092,256

PHONOGRAPH RECORD RACK

Filed Dec. 1, 1960

*INVENTOR.*
DAVID VERNIK

*BY*
Caesar and Rivise
ATTORNEYS.

3,092,256
PHONOGRAPH RECORD RACK

David Vernik, 845 Tyson Ave., Philadelphia, Pa.

Filed Dec. 1, 1960, Ser. No. 72,976
3 Claims. (Cl. 211—40)

This invention relates to a phonograph record rack and has as its objective the provision of a novel and inventive device of this class.

Recent developments in the phonograph record art have led to the introduction and subsequent wide acceptance of the concept of the "record library" which is in essence a substantial collection of phonograph records. It was at once clear that a workable record library could be achieved only if the multitude of phonograph records could be safely stored and yet be easily accessible.

As presently merchandised, phonograph records are sold in a protective jacket and are generally "unbreakable." With the presence of the protective jacket there has been a tendency on the part of the public to form piles of records. This, however, tends to introduce a clumsiness into the "record library" because the piles are necessarily of a limited height and also because a desired record may be at the bottom of a pile causing an undesirable delay in the search for it. Also, the piles may eventually tip or be destroyed by the inadvertence of someone in the vicinity.

Various record containers of a so-called "book form" consisting of many compartments, each to house a single record or group of records have been devised. These, however, have proved to be heavy and clumsy, especially in connection with phonograph records of a larger diameter. The continued lifting and lowering of the prior devices is obviously fraught with danger to the user and also to the phonograph records. Moreover, these prior devices may require extensive storage area and still provide problems in the location of a given phonograph record.

It is accordingly an object of the present invention to provide a phonograph record rack which achieves a compact but easily accessible grouping of the phonograph records.

Yet another object of this invention is to provide a phonograph record rack which constitutes a highly novel and useful piece of furniture or "conversation piece" and which accordingly enhances the attractiveness of a room.

Still another object of the present invention is to provide a phonograph record rack which compactly houses a "record library" of a large amount of records in a neat but highly functional arrangement.

A further object of the present invention is to provide a rack which not only holds and protects the phonograph records in a minimum of space but also permits easy access in the process of selecting a desired record.

Yet another object of the present invention is to provide a phonograph record rack which is simple and economical in construction and which is easily used.

The foregoing as well as other objectives of the invention are achieved by providing a phonograph record rack which basically comprises a central rotatable pole, an adjustable support collar releasably secured to and telescoped upon the pole, a slidable spool-shaped bracket with vertically spaced, generally parallel upper and lower flanges telescoped upon the pole and supported by the collar, said upper and lower flanges each having formed therein a plurality of spaced openings, L-shaped record album hanger members each including vertically spaced hook means releasably secured in complementary openings in said upper and lower flanges, the hanger members being pivotable about the hook means, the record album hanger members including spring clips or other holding means for releasably securing the record album.

Other objects and many of the attendant advantages of this invention will be readily appreciated as the same becomes better understood by reference to the following detailed description when considered in connection with the accompanying drawings wherein.

Figures 1, 4, 5, 6:
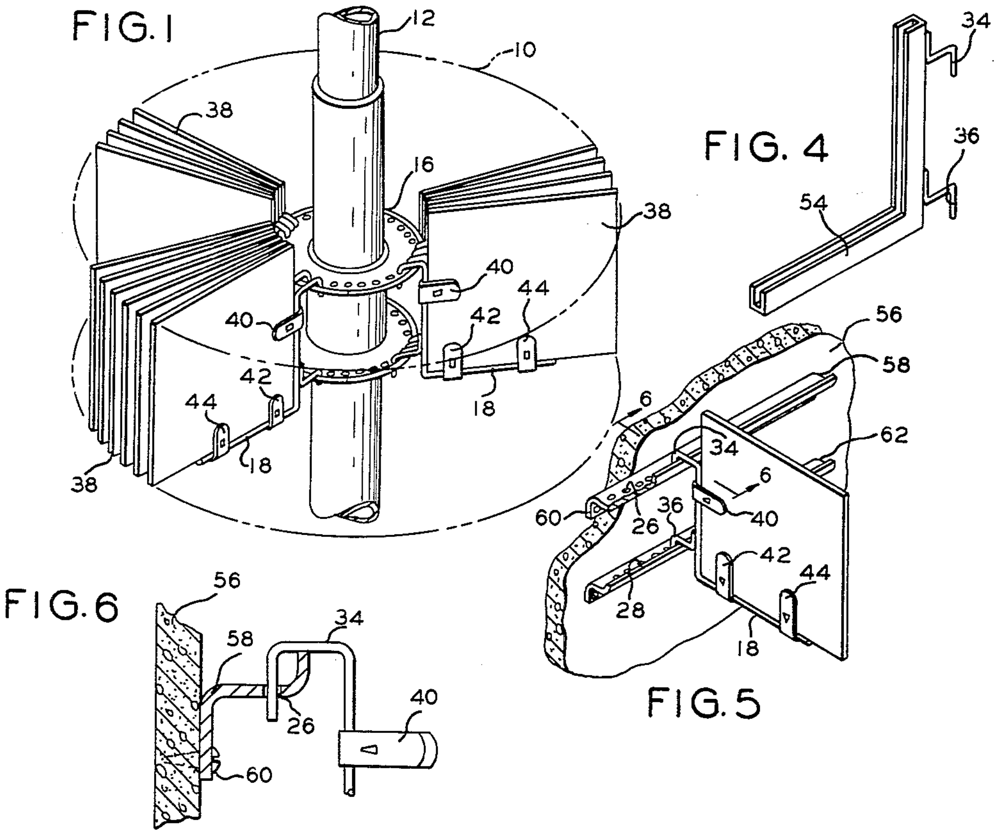
FIG. 1 is a detailed perspective view of a first embodiment of the present invention.
FIG. 4 is a perspective view on a reduced scale of a modification of the hanger member which may be used in connection with the present invention.
FIG. 5 is a perspective view of a second embodiment of the present invention secured to a wall and having a portion broken away to reveal several bracket holding openings.
FIG. 6 is a sectional view taken along the lines 6—6 of FIG. 5.

Referring now in greater detail to the various figures of the drawings wherein similar reference characters refer to similar parts, a phonograph record rack embodying the present invention is generally shown at 10 in FIG. 1. Rack 10 basically comprises a central rotatable pole 12, an adjustable support collar 14 (FIG. 2) releasably secured to and telescoped upon pole 12, a slidable spool-shaped bracket 16 held in place by the collar 14 and including means to releasably hold a plurality of L-shaped hanger members 18 each of which retain a phonograph record album.

Rack 10 generally comprises a pole 12 pivotable about its own central axis. The pole 12 may be of a metallic material and may take the form essentially of poles used in the well known pole lamp assemblies.

Figures 2, 3:
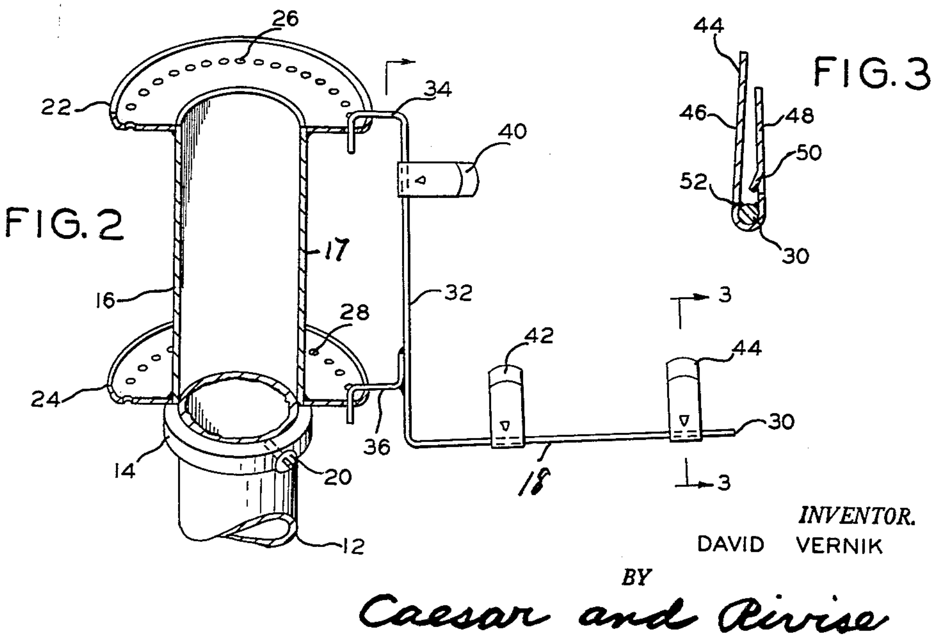
FIG. 2 is an enlarged fragmentary perspective view, partly in section, of a portion of the device of FIG. 1.
FIG. 3 is an enlarged sectional view taken along the lines 3—3 of FIG. 2.

As shown in FIG. 2, the adjustable support collar 14 possesses an inner diameter slightly greater than the outer diameter of pole 12 and includes an opening which receives a set screw 20 for fastening of the collar to the central pole 12. Slidable spool-shaped bracket 16 includes a neck portion 17, with inner diameter slightly greater than the outer diameter of pole 12 and is positioned immediately over collar 14 to be supported thereby. Slidable bracket 16 includes a pair of parallel spaced circular vertically spaced and generally parallel flanges 22 and 24 each respectively having a plurality of openings 26 and 28 formed therein in order to receive the hanger member 18.

As shown in FIG. 2, the hanger member 18 is generally L-shaped and includes a generally horizontal arm 30 and a generally vertical arm 32. Affixed to the generally vertical arm 32 are vertically spaced hook means 34 and 36 which interfit as shown in FIG. 2 respectfully in complementary vertical spaced openings 26, 28. In this connection it should be noted that the generally vertical arm 32 deviates slightly from a vertical axis for a slight angle in such a manner that the hanger means 36 is spaced a slightly greater distance from the flange 24 than is the hanger means 34 spaced from the flange 22. This deviation is desired because the weight of the record album positioned on hanger member 18 will cause the vertical arm to move essentially to a vertical position to eliminate the aforesaid slight deviation.

Furthermore, for similar reasons, the angle between the arms 30 and 32 is slightly less than a right angle but will be broadened essentially to a right angle by the weight of the record album when it is positioned upon the hanger member 18.

The record albums 38 are supported on the hanger member 18 by holding means such as associated spring clips 40, 42 and 44 which as shown in FIG. 3 each include a large tab 46 which is wrapped about the arm 30 and a smaller tab 48 generally parallel to the tab 46, integral therewith but tending to exert a finger action because it tapers upwardly toward the tab 46. A lance 50 may protrude from tab 48 to aid in the grasping of a record album 38. Alternatively, the lance 50 may protrude from larger tab 46. The spring clips are welded to the arms as shown in FIG. 3. The other spring clips 40 and 42 are similarly constructed.

In operation the collar 14 is fastened at a desired position along the pole 12 by tightening of the set screw 20. The bracket 16 is positioned upon the collar 14 and the pole 12 then erected into vertical position. Individual record albums are positioned each on a hanger member 18 and held thereon by spring clips 40, 42 and 44, the hanger members preferably being positioned on the bracket 16 in advance although the opposite procedure may be followed if so desired. It should be noted that the same pole 12 may accommodate several brackets 16 and thereby hold many more records. The brackets 16 would be vertically spaced from each other, telescoped about pole 12. Additional collars 14 are preferably employed.

It should be noted that the pole 12 may pivot about its own axis in order to give a 360° access to a desired record album. In addition an individual record album located on each hanger member 18 may pivot to some extent about the vertical axis located where the hook means 34, 36 interfit in openings 26, 28 in the bracket 16. Hence, the examination of individual record albums is greatly facilitated without requiring a removal of any single record album and disturbed surroundings.

As shown in FIG. 4 the hanger member 54 may be of a channel shape in order to eliminate the spring clips. The remainder of the structure of device 10 is generally retained including hook means 34 and 36 welded to the channel member. Alternatively, hook means 34 and 36 may be formed from a single length of wire secured to or threaded through appropriate openings in the vertical leg. The channel member may, if desired, be formed of a resilient metal with the legs of the channel being bent toward each other in a manner similar to the showing of FIG. 3. Additionally dimples or lances may be formed in either or both opposed legs of the channel material in both the horizontal leg 30 and the vertical leg 32.

An alternate embodiment of the present invention is shown in FIG. 5 wherein the pole 12 is eliminated and the bracket fastened directly against a wall 56. In this embodiment the bracket 58 performs the function of upper flange 22, is generally angle shaped and is fastened to wall 56 by bolts 60. A second angle shaped bracket 62 vertically spaced from and parallel to bracket 58 is employed in order to perform the function of the lower flange 24 of the device of FIG. 1. The hanger member 18 of FIG. 5 is generally similar to the hanger member 18 of FIG. 1 or as shown in FIG. 4 and includes hook means 34, 36 which interfit in spaced openings 26, 28 of the bracket members. In this connection attention is called to FIG. 6 for further details regarding the specific interfitting of rack means 34 in the respective openings in the angle members.

Obviously many modifications and variations of the present invention are possible in the light of the above teachings. It is, therefore, to be understood that within the scope of the appended claims, the invention may be practiced otherwise than as specifically described.

What is claimed as the invention is:

1. A phonograph record rack comprising in combination a central pole, an adjustable support collar releasably secured to and telescoped upon said pole, a slidable spool shaped bracket revolvably telescoped upon said pole and supported by said collar, said bracket including vertically spaced, generally parallel upper and lower flanges each having formed therein a plurality of vertically aligned spaced openings, a plurality of L-shaped record hanger members having vertically spaced hook means releasably secured in complementary openings in said upper and lower flanges, said hanger members being of channel stock for retention of a phonograph record, said hanger members being revolvable about said pole and being pivotable about the vertical axis through said hook means.

2. The invention of claim 1 wherein said record hanger members each include a generally horizontal leg and a generally vertical leg, said vertical leg being disposed at a slight angle downwardly away from said pole.

3. The invention of claim 2 wherein said record hanger members each include a generally horizontal leg and a generally vertical leg, said legs intersecting at an angle slightly less than a right angle.

References Cited in the file of this patent

UNITED STATES PATENTS

| | | |
|---|---|---|
| 338,288 | Normandy | Mar. 23, 1886 |
| 452,957 | Stanton | May 26, 1891 |
| 1,421,391 | Bower | July 4, 1922 |
| 2,760,674 | Karp | Aug. 28, 1956 |
| 2,804,212 | Spitzig | Aug. 27, 1957 |